United States Patent [19]

Cope

[11] Patent Number: 4,623,487

[45] Date of Patent: Nov. 18, 1986

[54] PROCESS FOR RECOVERY OF FLUOROSURFACTANTS

[75] Inventor: Charles S. Cope, Parkersburg, W. Va.

[73] Assignee: E. I. Du Pont de Nemours & Company, Wilmington, Del.

[21] Appl. No.: 825,881

[22] Filed: Feb. 7, 1986

Related U.S. Application Data

[63] Continuation-in-part of Ser. No. 711,835, Mar. 14, 1985, abandoned.

[51] Int. Cl.⁴ ..................... C07C 51/02; C07C 51/48; C11C 1/00
[52] U.S. Cl. .................................. 260/408; 562/605
[58] Field of Search ....................... 260/408; 562/605

[56] References Cited

U.S. PATENT DOCUMENTS

| | | | |
|---|---|---|---|
| 2,863,889 | 12/1958 | Marks | 260/408 |
| 2,948,741 | 3/1956 | Barnhart | 260/408 |
| 3,215,620 | 11/1965 | Dunning | 210/21 |
| 3,215,621 | 11/1965 | White | 210/21 |
| 3,259,568 | 7/1966 | Jordan | 210/28 |
| 3,882,153 | 5/1975 | Seki | 260/408 |
| 4,005,137 | 1/1977 | Rudolph | 562/605 |
| 4,049,681 | 9/1977 | Dietrich | 562/605 |
| 4,282,162 | 8/1981 | Kuhls | 260/408 |

*Primary Examiner*—Michael L. Shippen

[57] ABSTRACT

A process for recovering a fluoroalkanoic acid from an aqueous medium which comprises treating an aqueous mixture containing the acid or a selected salt of the acid with a selected quaternary ammonium salt to form an organic compound, contacting the resulting mixture with a chlorinated hydrocarbon liquid to extract the organic compound from the aqueous liquid into the organic liquid, distilling the extractant, then acidifying the organic compound and steam distilling.

4 Claims, No Drawings

PROCESS FOR RECOVERY OF FLUOROSURFACTANTS

CROSS REFERENCE TO RELATED APPLICATIONS

This application is a continuation-in-part of application Ser. No. 711,835, filed Mar. 14, 1985, now abandoned.

FIELD OF THE INVENTION

This invention comprises a process for the high-yield recovery, in re-usable, high-purity condition, of perfluorinated, or substantially perfluorinated, surfactants of the anionic type from solution in an aqueous medium, even when present in relatively low concentration. Such solutions are encountered frequently in the manufacture of fluoropolymers, such as tetrafluoroethylene polymers, via aqueous processes.

BACKGROUND OF THE INVENTION

Fluorinated surfactants are widely used in the manufacture of fluoropolymers (and copolymers) in aqueous media. Though chiefly used in the manufacture of fluoropolymer dispersions and of the dry, solid polymers derived therefrom, they are also commonly employed in the manufacture of slurry-(the so-called granular-) type polymer as well, as described, for example, for the polymerization of tetrafluoroethylene (TFE) in U.S. Pat. Nos. 3,245,972; 3,629,219; 3,855,191, and 4,189,551. Chief among the fluorinated surfactants generally used are perfluoroalkanoates, especially perfluorooctanoate, usually in the form of the ammonium salt (APFO), although alkali metal salts and even the corresponding free acid may alternatively be used.

These fluorinated surfactants are intrinsically valuable, but their recovery is difficult because their concentrations in spent polymerization media are relatively low. Furthermore, the surfactants consist of molecules having more-or-less distinct polar and non-polar portions, so that they tend to "bridge" ordinarily immiscible media such as might otherwise be used for their separation, as, for example, by liquid-liquid extraction. In addition, the surfactants have pronounced, and generally undesirable, foaming tendencies, especially in aqueous media.

Despite these difficulties, recovery of the surfactants is desirable because the disposal of spent reaction mixtures by acceptable means is difficult.

It is desirable to provide a process for recovery of the surfactants which employs common, inexpensive inorganic reagents and a simple organic solvent, thereby avoiding the complexity of such techniques as ion exchange for effecting the separation of the surfactants, which overcomes foaming by appropriate choices of media and conditions, especially of pH level, and which can be carried out at atmospheric pressure, and at ambient temperature.

SUMMARY OF THE INVENTION

A process for recovering fluoroalkanoic acid from an aqueous medium which comprises
(a) treating an aqueous mixture containing a compound of the formula $$X\text{-}R_f\text{-}COOM$$

where $R_f$ is a saturated, perfluorinated linear or methyl-branched alkylene group containing from 5 to 10 carbon atoms, X is a member of the class consisting of hydrogen, fluorine or chlorine, and M is a member of the class consisting of H, ammonium or alkali metal, with a quaternary ammonium compound of the formula

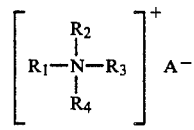

where each R is alkyl of 1 to 16 carbon atoms, aryl of 6-10 carbon atoms or aralkyl of 7-11 carbon atoms, with the proviso that the sum of the carbon atoms in $R_1$ and $R_2$ equals at least 15, and A is an anion, to form a quaternary ammonium fluoroalkanoate salt,
(b) contacting the resulting mixture formed in (a) with a chlorinated hydrocarbon liquid to extract the salt from the aqueous mixture,
(c) separating the salt from the chlorinated hydrocarbon liquid,
(d) adding acidified water to the separated salt and subjecting the resulting mixture to steam distillation whereupon the fluoroalkanoic acid is distilled, and
(e) collecting the fluoroalkanoic acid distillate.

DETAILED DESCRIPTION OF THE INVENTION

The present invention is directed primarily to the recovery of fluoroalkanoic acid or salt from aqueous solution or mixture containing them by reaction with a quaternary ammonium compound, followed by extraction.

Typical examples of quaternary ammonium compounds useful in this invention are di-n-decyldimethylammonium chloride, hexadecyltrimethylammonium chloride, n-tetradecylbenzyldimethylammonium chloride, n-octyldodecyldimethylammonium chloride, and the like. Hexadecyltrimethylammonium chloride is preferred. The analogous bromides may also be used. The particular anion of the quaternary ammonium compound is not critical so long as it does not interfere with formation of the salt formed by interaction of the quaternary ammonium cation and the fluoroalkanoate anion.

A highly attractive feature of the use of these quaternary ammonium cations in their reaction with fluoroalkanoate anions is that no significant excess of the cation over the stoichiometric requirement is needed; i.e., the reaction is essentially quantitative, even in relatively dilute aqueous solution, at room temperature. The quaternary ammonium compound is simply added to the aqueous mixture. If desired, the aqueous mixture may be acidified, preferably with a mineral acid, prior to the extraction step.

The extraction step is carried out simply by adding a chlorinated hydrocarbon liquid (liquid at ordinary room temperature, i.e., about 22° C.), e.g., di- or trichloromethane, and agitating at room temperature for a short time. The bulk of the quaternary ammonium salt transfers into the chlorinated hydrocarbon organic layer.

The quaternary ammonium fluoroalkanoate salt (hereinafter called the "quaternary ammonium salt") formed is efficiently separated from the other components of the reaction (which include an inorganic ammonium salt, such as ammonium chloride) when extraction is performed. The inorganic salt remains predominantly in the aqueous liquor. In addition, there is no pronounced foaming tendency when the system is agitated during extraction, especially if the acidification mentioned above is carried out.

An advantage of this extraction procedure is that it can accommodate the presence of fluoropolymer in the feed stream, as frequently occurs in the aqueous streams encountered in the manufacture of fluoropolymers. Even if such polymer is colloidally dispersed, as is frequently the case, it does not disturb the extraction process significantly, since it tends to coagulate during extraction and can be filtered out without difficulty.

Separation of the quaternary ammonium salt from the chlorinated hydrocarbon is accomplished by evaporation of the chlorinated hydrocarbon.

Once the quaternary ammonium salt has been isolated, either as a dry solid or in relatively concentrated solution in the extractant liquid, the recovery of fluoroalkanoic acid can be accomplished by steam distillation. While one distillation will suffice, for highest purity two successive distillations in the presence of strong aqueous sulfuric acid (the second in the added presence of an oxidizing agent, such as $K_2Cr_2O_7$, to effect final purification) are preferred. Whether one or two distillations are carried out, neutralization of the distillate with ammonium hydroxide will result in the fluoroalkanoate ammonium salt. If two distillation steps are carried out, a distillate acidification step to effect a concentration of the fluoroalkanoic acid in the first distillate may be carried out. It was not expected that the quaternary ammonium salt could be cleaved by distillation to yield aqueous fluoroalkanoic acid in the distillate, with the quaternary ammonium cation remaining in the stillpot (with the aqueous sulfuric acid).

Even low amounts of the fluoroalkanoic acid or salt thereof can be efficiently recovered. At a relatively low concentration of 170 ppm by weight, about 95% recovery is achievable. In general, the lower the fluoroalkanoate concentration, the more care must be taken in minimizing extractant losses (by evaporation, etc.) to avoid having the cost of extractant exceed the value of the recovered surfactant.

The distillation from aqueous sulfuric acid generally proceeds without difficulties being posed by the foaming proclivities of the fluoroalkanoic acid. A foaming problem does not appear to become significant until the last portion (ca. 5%) of the fluoroalkanoic acid leaves the stillpot.

While directed primarily toward the recovery of fluoroalkanoate surfactant (either in the form of the ammonium or alkali metal salts, or of the corresponding free acid), and especially of perfluorooctanoate, the invention is not limited solely to this type. Other perfluoroalkanoates include perfluorohexanoate (C-6) or perfluoroheptanoate (C-7) surfactants, or perfluorononanoate (C-9) or perfluorodecanoate (C-10) surfactants. These may be either linear or branched. In the C-9 and C-10 types, the lower volatility of the corresponding free acids may require higher concentrations of aqueous sulfuric acid in the double steam distillation steps used for recovery and purification, in order to provide a higher boiling point and thus achieve the desired high concentrations of the fluorocarbon acids in the distillates.

Similarly, the process of the invention can also be applied to fluorosurfactants in which some atom(s) other than fluorine is (are) present, as, for example, in those compounds listed above in which a hydrogen or chlorine atom replaces a fluorine atom in the omega position, as, for example, in ω-hydro(per)fluorononanoate surfactant.

EXAMPLES

Example 1

Step (a)

To 15 ml of a 0.1 wt % aqueous solution of ammonium perfluorooctanoate ("Fluorad" FC-143, sold commercially by 3M Company, St. Paul, MN) was added (at room temperature) 12.7 ml of a 0.1 wt % aqueous solution of hexadecyltrimethylammonium bromide (Reagent grade, sold by J. T. Baker Chemical Company of Phillipsburg, NJ). The amounts of the two reagents taken were stoichiometrically equivalent on a 1:1 molar basis.

Step (b)

To a 10-ml aliquot of the resulting solution (contained in a 125-ml glass separatory funnel of the Squibb type) was added 1 ml of an aqueous solution containing 66 mg of concentrated sulfuric acid and 210 mg of sodium dihydrogen phosphate monohydrate buffer. A 5-ml quantity of trichloromethane was then added. The contents of the funnel were shaken vigorously for 2 minutes. No significant degree of stable foam formation was encountered.

Step (c)

After a setting period of about 45 minutes, the lower layer (which was colorless and nearly clear) was withdrawn. After evaporation of the extract in a stream of nitrogen at room temperature, a white solid residue consisting of hexadecyltrimethyl ammonium perfluorooctanoate remained.

Step (d) and (e)

A 4.29-g quantity of dried hexadecyltrimethylammonium perfluorooctanoate extract obtained as described above was charged to a glass distilling apparatus with 20 ml (28 g) of 50% by weight aqueous sulfuric acid. Distillation was begun, and continued in steps, with demineralized water being added to the stillpot in portions about equal to the volume of the distillate whenever the volume of distillate (consisting of a gelatinous slurry of slightly impure perfluorooctanoic acid in water) reached between about 2 and 4 ml. (The purpose of these additions was to avoid concentrating the nonvolatile sulfuric acid much over its initial value, which would have caused the boiling point to rise and the level of unwanted impurities containing C-H bonds in the distillate possibly to increase.) For the most part, foaming in the stillpot was not a problem, although a tendency for it to occur was noted when boiling recommenced after addition of water to the stillpot, at which time care had to be taken to avoid carryover of foam into the condenser and the distillate.

Example 2

Step (a)

A gaseous waste stream produced in the manufacture of tetrafluoroethylene/hexafluoropropylene copolymer was used. The gas was the vapor given off from drying wet, coagulated polymer which had been synthesized in aqueous medium, using ammonium perfluorooctanoate as dispersing agent. It was passed through a water scrubber and the water in the scrubber liquor was used herein. The vapor contained by analysis 0.017 wt % of ammonium perfluorooctanoate. A 2000-ml aliquot of this liquor of pH about 5 was further acidified to a pH of about 2 with 50 wt % aqueous sulfuric acid, and then treated with a 1:1 stoichiometric equivalent of aqueous hexadecyltrimethylammonium chloride solution of 0.100 wt % concentration.

Step (b)

The resulting solution was extracted at room temperature in a 3000-ml separatory funnel of the Squibb type with dichloromethane. The extraction was carried out in two (successive) stages, with 200 ml of extractant used each time; the two extracts were kept separate after each had been drawn off 30 minutes after a 2-minute shaking period. In this manner, a total of 8 liters of scrubber liquor was treated.

Step (c)

The solvent was evaporated off under ambient conditions. The recovered solid was white, and of somewhat waxy consistency. The amount of solid hexadecyltrimethylammonium fluorooctanoate recovered after evaporation of solvent from the combined first-stage dichloromethane extracts was about 75% greater than that from the combined second-stage extracts, with the total amount corresponding to an overall yield approaching 95 percent of theoretical.

Step (d) and (e)

A 0.815-g aliquot of the (combined) recovered solid was subjected to simple distillation, at atmospheric pressure, in the presence of 20 ml (27.7 g) of 50 wt % aqueous sulfuric acid solution. A recovery of 95% of perfluorooctanoic acid was achieved in the distillate before the contents of the distilling flask began to foam to a degree such that carry over into the condenser and distillate could have occurred had distillation been further continued. The distillate consisted of slightly impure perfluorooctanoic acid as a mobile, somewhat gelatinous slurry of about 10 wt % concentration in water.

Steam distillation in the presence of a nonvolatile mineral acid and an oxidizing agent such as potassium dichromate results in more pure perfluorooctanoic acid.

Analytical Method

For analytical determination of ammonium perfluorooctanoate (APFO) a modification of the very sensitive colorimetric extractive procedure for analysis of anionic surfactants, as described in the "Encyclopedia of Industrial Chemical Analysis," Vol. 1, pp. 339-40, Interscience Publishers, New York, N.Y. (1971), was used. The method involves the use of a cationic blue dye (such as methylene blue or Azure A) to form an extractable blue complex which has an absorbance peak in the visible region at about 635 nm. Appropriate sample dilutions were used to obtain peak absorbance values in the range between 0 and 1, and "blank" corrections were applied. In those cases in which a source of potential interference was present (as, for example, a cationic surfactant such as a quaternary ammonium salt), the sample was first steam-distilled at atmospheric pressure in the presence of dilute aqueous phosphoric acid to separate the APFO (as the corresponding acid) into the distillate fraction, with the colorimetric procedure outlined above then applied to the distillate. Distillation was continued until the level of APFO coming over was insignificant.

I claim:

1. A process for recovering fluoroalkanoic acid from an aqueous medium which comprises
   (a) treating an aqueous mixture containing a compound of the formula $X-R_f-COOM$ 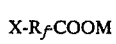

where $R_f$ is a saturated, perfluorinated linear or methyl-branched alkylene group containing from 5 to 10 carbon atoms, X is a member of the class consisting of hydrogen, fluorine or chlorine, and M is a member of the class consisting of H, ammonium or alkali metal, with a quaternary ammonium compound of the formula

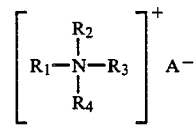

where each R is alkyl of 1 to 16 carbon atoms, aryl of 6–10 carbon atoms or aralkyl of 7–11 carbon atoms, with the proviso that the sum of the carbon atoms in $R_1$ and $R_2$ equals at least 15, and A is an anion, to form a quaternary ammonium fluoroalkanoate salt,
   (b) contacting the resulting mixture formed in (a) with a chlorinated hydrocarbon liquid to extract the salt from the aqueous mixture,
   (c) separating the salt from the chlorinated hydrocarbon liquid,
   (d) adding acidified water to the separated salt and subjecting the resulting mixture to steam distillation whereupon the fluoroalkanoic acid is distilled, and
   (e) collecting the fluoroalkanoic acid distillate.

2. The process of claim 1 wherein the perfluoroalkanoic acid is perfluorooctanoic acid.

3. The process of claim 1 wherein the chlorinated hydrocarbon is dichloromethane or trichloromethane.

4. The process of claim 1, 2 or 3 wherein the aqueous medium is the spent polymerization medium resulting from the manufacture of fluoropolymers.

* * * * *